UNITED STATES PATENT OFFICE.

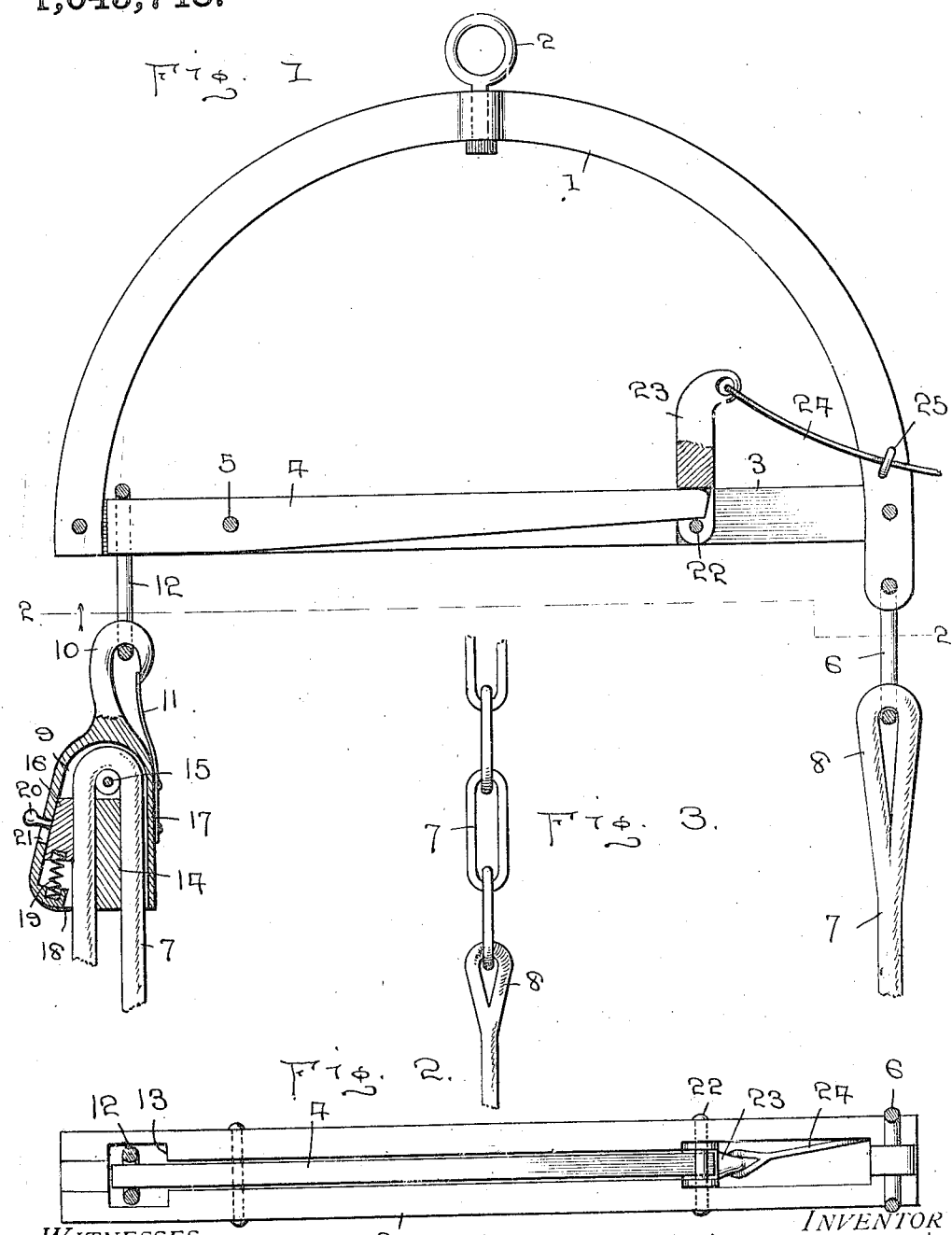

ANDREW J. ROBERTS, OF LICKCREEK, ILLINOIS.

HAY-SLING.

1,045,748.	Specification of Letters Patent.	Patented Nov. 26, 1912.

Application filed May 1, 1912. Serial No. 694,322.

*To all whom it may concern:*

Be it known that I, ANDREW J. ROBERTS, a citizen of the United States, residing at Lickcreek, in the county of Union and State of Illinois, have invented certain new and useful Improvements in Hay-Slings; and I do hereby declare the following to be a full, clear, and exact description of the invention, such as will enable others skilled in the art to which it appertains to make and use the same.

This invention relates to hoisting devices and more particularly to hay slings.

An object of the invention is to devise a hay sling which will be of simple construction and positive in operation.

Another object is to provide a device of this character, which may be employed upon various forms of hoisting devices and which may be readily operated to release the load.

A further object is to provide a hay sling of this type comprising an arch, the lower ends of which are connected by parallel cross pieces, between which a trip lever is pivoted near one end, said lever being adapted to lock at one end and to carry a link loosely engaged over its opposite end.

Other objects and advantages will be hereinafter made clearly apparent in the specifications and pointed out in the claims.

In the accompanying drawings, which are made a part of this application, Figure 1 is an elevational view, parts being shown in section and the central portion of the article engaging member being broken away. Fig. 2 is a cross sectional view on the line 2—2 of Fig. 1, looking in the direction of the arrow, and, Fig. 3 is a fragmentary view of a portion of the article engaging member.

Referring to the drawings, in which similar reference numerals designate corresponding parts throughout the several views, 1 represents the arch, carrying the ring 2 at its central portion which may be engaged with any form of hoisting devices, as will be clearly understood. The ends of the arch 1 are connected by the spaced parallel cross pieces 3, between which is pivoted the trip lever 4, said lever being pivoted near one end by means of the pivot pin 5 passed therethrough and through the spaced cross pieces 3.

One end of the arch 1 is extended outwardly slightly below the ends of the cross pieces 3 and has a link 6 passed therethrough, to which link 6 is secured one end of the article engaging member 7, which may be in the form of a rope or cable, as shown in Fig. 1, or in the form of a chain 7', as shown in the modified form in Fig. 3. In either instance, however, I prefer to employ the loop 8 at the opposite ends of the article engaging member.

The opposite end of the article engaging member 7 is passed through the clamp 9, which is provided with a hook 10 and spring 11 engaging the curved end of the hook 10, which snaps over the link 12. The link 12 in turn is engaged over the end of the trip lever 4 adjacent the pivot pin 5, the cross pieces 3 being bent outward from each other to form an eye as shown at 13 to allow ready engagement of the link 12 over the trip lever 4. The link 12 is prevented from slipping off of the end of the trip lever 4 while the latter is locked in its horizontal position, as will be later more fully described, owing to the fact that the lever 4 is of such length that the end over which the link is engaged works adjacent the end of the arch 1.

The free end of the article engaging member 7 is passed around the cross partition 14 and over the roller 15 within the clamp 9, a suitable wedge member 16 being positioned between the article engaging member 7 and the far side casing 17 of the clamp 9, said wedge member 16 wedging the member 7 against the partition 14. The lower edge of the casing 17 is curved inwardly, as shown at 18, beneath the wedge member 16 and a spring 19 is positioned between portion 18 of the casing and the wedge 16, said spring resiliently holding the wedge member in its uppermost position. It will be understood that the far side of the casing 17 slants upwardly and causes strain upon the article engaging member 17 from the material around which the member 7 is engaged to tighten the end of said member 7 between the wedge member 16 and the partition 14. The wedge member 16 guided in its vertical movement by means of the knob 20 projecting therefrom and works through 21 in the slanting wall of the casing 17. It will be seen that the member 7 may be loosened and lengthened or shortened, as desired, by forcing the knob 20 downwardly, causing the wedge member 16 to move downwardly against the tension of the spring 19, thus leaving the end of the member 17 free to be moved in either direction over the roller 15.

The trip lever 4 stops short of the opposite end of the cross pieces 3 and the arch 1 and pivoted between the cross pieces 3, and upon a pivot pin 22 beneath this end of the lever 4, is the lower end of forked latch member 23, which is adapted for engagement over the end of the lever 4 to lock the latter in its horizontal position between the cross pieces 3 when said latch member is in its vertical position. It will be understood that the cross pieces 3 are bent outwardly from each other at this end to accommodate the latch member 23. A releasing cord 24 has one end secured to the free end of the latch member 23 and passes through an eye 25 secured upon the arch 1, said releasing cord extending from the eye 25 to any suitable point to be controlled by the operator for releasing the trip lever 4 to dump the article or articles around which the article engaging member 7 is engaged.

It will be seen that this form of sling may be employed with various types of hoisting devices or may be used simply with a pulley and cable, the cable being operated by an engine or any other suitable power. It will also be evident that it is simply necessary to place the article engaging member 7 around a bale or bales of hay or any other article to be handled, hook the link 12 over the end of the trip lever 4 adjacent the pivot pin 5, press the opposite end of the lever 4 downward and move the latch member 23 over to its position above the last mentioned end of said lever to lock the same in its horizontal position between the cross pieces 3 and parallel therewith. The sling may then be raised and carried to the position where it is desired to dump the article or articles and by pulling slightly upon the releasing cord 24, the latch member 23 will be drawn from its position upon the end of the trip lever 4, when the latter will swing automatically upon its pivot 5, allowing the link 12 to slide off the end thereof, thus dumping the articles upon the article engaging member 7. It will also be clearly understood that the length of the article engaging member 7 may be readily varied, as above described, to accommodate articles of various sizes. Further, it will be clearly apparent that the strain is equally distributed and the device will therefore be strong and durable in use.

What I claim is:

1. In combination, a bow having suspending means at its medial portion and having downwardly directed end portions, a pair of horizontal beams spaced apart and secured to the downwardly directed ends of the bow, a horizontal lever between the beams and pivotally connected thereto, a latch pivotally connected to the horizontal beams and adapted to engage an end of the lever, a flexible sling member permanently secured to an end of said bow, a link removably engaging an end of the lever adjacent to the other end of said bow, a combined clamping and adjusting means for the flexible sling member engaging the latter and being supported by said link, and means for releasing the engagement of the lever and latch.

2. In combination, a pair of spaced horizontal beams, suspending means secured to the ends of the beams and extending thereabove, a lever disposed between the beams and pivoted adjacent to an end thereof, a latch pivoted to the beams adjacent to the other end of the lever, a flexible sling member permanently supported under certain adjacent ends of the beams, sling adjusting means under the other adjacent ends of the beams for adjustably engaging the sling member, a link supported by the lever and supporting the sling adjusting means, and means for releasing the engagement of the latch and lever and thereby dislodging the link from the lever.

In testimony whereof I have signed my name to this specification in the presence of two subscribing witnesses.

ANDREW J. ROBERTS.

Witnesses:
C. A. HOUSTON,
L. R. CALHOON.